(12) United States Patent
Fakes et al.

(10) Patent No.: US 11,349,370 B2
(45) Date of Patent: May 31, 2022

(54) ROTARY ELECTRIC MACHINE WITH SHRINK-FITTED BEARING

(71) Applicant: Valeo Equipements Electriques Moteur, Creteil (FR)

(72) Inventors: Michel Fakes, Créteil (FR); Yannick Le-Meitour, Créteil (FR); Eric Simon, Créteil (FR); Matthieu Bonnici, Créteil (FR); Xavier Dunesme, Créteil (FR); Mathieu Redon, Créteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 214 days.

(21) Appl. No.: 16/609,071

(22) PCT Filed: Apr. 26, 2018

(86) PCT No.: PCT/EP2018/060796
§ 371 (c)(1),
(2) Date: Oct. 28, 2019

(87) PCT Pub. No.: WO2018/197640
PCT Pub. Date: Nov. 1, 2018

(65) Prior Publication Data
US 2020/0153309 A1    May 14, 2020

(30) Foreign Application Priority Data

Apr. 28, 2017 (FR) ....................................... 1753747
Apr. 28, 2017 (FR) ....................................... 1753748
Apr. 28, 2017 (FR) ....................................... 1753750

(51) Int. Cl.
*H02K 5/173* (2006.01)
*H02K 1/18* (2006.01)
*H02K 9/22* (2006.01)
*H02K 9/06* (2006.01)

(52) U.S. Cl.
CPC ............ *H02K 5/1732* (2013.01); *H02K 1/185* (2013.01); *H02K 9/22* (2013.01); *H02K 9/06* (2013.01)

(58) Field of Classification Search
CPC ........ H02K 5/1732; H02K 1/185; H02K 9/22; H02K 9/06; H02K 2213/03; H02K 11/33; H02K 5/15; H02K 5/20
See application file for complete search history.

(56) References Cited

U.S. PATENT DOCUMENTS

| 4,926,076 A | 5/1990 | Nimura et al. |
| 2002/0130570 A1* | 9/2002 | Howe ...................... H02K 5/08 310/89 |

(Continued)

FOREIGN PATENT DOCUMENTS

| DE | 10 2015 105475 A1 | 10/2015 |
| EP | 0300063 A1 | 1/1989 |

(Continued)

OTHER PUBLICATIONS

Korean Office Action in corresponding Korean Application No. 2019-7034993, dated Jul. 21, 2020 (12 pages).

(Continued)

*Primary Examiner* — Tulsidas C Patel
*Assistant Examiner* — Riley Owen Stout
(74) *Attorney, Agent, or Firm* — Osha Bergman Watanabe & Burton LLP

(57) ABSTRACT

The invention relates mainly to a rotary electric machine for a motor vehicle. The machine (10) comprises a shaft (13); a rotor (12); a stator (16) comprising a body (25) provided with slots, and a winding (26) inserted into the slots; a first bearing (37) and a second bearing (38) surrounding an assembly formed by the rotor and the stator and each comprising a housing (40, 44) for rotatably mounting the (Continued)

rotor shaft (13). The first bearing comprises a transverse flange (371) and a cylindrical wall (372) of axial orientation derived from an outer periphery of said flange. The second bearing comprises a transverse flange (48) closing the first bearing and at least one rim (63) projecting from the flange and forming a junction area (64) where it joins the first bearing. Furthermore, the stator body has a region (Z1) of shrink-fitting to the cylindrical wall.

13 Claims, 4 Drawing Sheets

(56) References Cited

U.S. PATENT DOCUMENTS

2005/0121988 A1  6/2005  Howe et al.
2015/0042187 A1*  2/2015  Bradfield ............. H02K 11/046
                                              310/59

FOREIGN PATENT DOCUMENTS

| EP | 0539339 A1 | 4/1993 |
| EP | 1361646 A2 | 11/2003 |
| FR | 2745445 A1 | 8/1997 |
| JP | 2003-324918 A | 11/2003 |
| JP | 2008-125352 A | 5/2008 |
| WO | 2013/187585 A1 | 12/2013 |

OTHER PUBLICATIONS

International Search Report and Written Opinion in corresponding International Application No. PCT/EP2018/060796, dated Jul. 30, 2018 (11 pages).

* cited by examiner

ROTARY ELECTRIC MACHINE WITH SHRINK-FITTED BEARING

The present invention concerns a rotary electrical machine. The invention relates to the field of rotary electrical machine such as motors, alternators, or alternator starters, or also a reversible machine which can operate as a motor and a generator.

In a known manner, an electrical machine of the alternator type comprises a housing, and inside the housing a rotor with claws which is integral in rotation with a shaft, and a stator which surrounds the rotor with the presence of an air gap.

The stator comprises a body in the form of a set of metal plates provided with notches for fitting of the stator winding. The phase windings of the winding are for example three-phase windings which are connected in the form of a star or a triangle, the outputs of which are connected to an electronic module comprising rectifier elements, such as diodes or transistors.

In the prior art, the housing comprises bearings in the form of a bowl comprising centrally a receptacle for receipt of a roller bearing for fitting of the rotor shaft with rotation. In addition, one of the bearings supports the electronic module. These bearings are supported on the stator body, which is fitted clamped between these two bearings, and reference is then made to a sandwich configuration. The bearings act as heat dissipaters, and thus contact between the body of the stator and the bearing makes it possible to discharge the heat from the stator.

This assembly of the sandwich type permits shrink fitting between the bearings and the stator, but the height of shrink fitting is limited, because an assembly gap is necessary between the front bearing and the rear bearing. In practice it is not possible to exceed two thirds of the height of the stator body. In addition, the shrink fitting is not possible in the areas of passage of the assembly tie rods. In addition, with this type of configuration, the shrink fitting cannot be optimised because of the form of the bearings, which can undergo deformations if the clamping is too great. The surface of contact between the bearings and the stator body is thus limited, which reduces correspondingly the heat discharge surface.

In addition, with this type of sandwich configuration, the centring of the bearings relative to the stator can not be optimal because of the assembly gap which is necessary between the bearings and the stator body. Since this centring is not well controlled, the air gap between the stator and the rotor must be reasonably large in order to prevent any risk of contact between the rotor and the stator during the operation of the machine.

Insufficient cooling of the electrical machine and an increase in the size of the air gap gives rise to a decrease in the performance of the said machine, or even to a risk of poor operation or breakage of this machine.

The objective of the present invention is thus to improve the disadvantages previously described. For this purpose, the invention relates to a rotary electrical machine for a motor vehicle. According to the invention, the machine comprises a shaft which extends along an axis; a rotor fitted on the shaft; a stator which surrounds the rotor with the presence of an air gap, the said stator comprising a body provided with notches and a winding inserted in the notches; a first bearing and a second bearing surrounding an assembly formed by the rotor and the stator. In addition, according to the invention, the first bearing comprises a transverse flange and a cylindrical wall with axial orientation obtained from an outer periphery of the said flange; and the second bearing comprises a transverse flange which closes the first flange and at least one rim which extends projecting from the flange and forms an area of junction with the first bearing. In addition, according to the invention, the stator body comprises an area of shrink fitting with the cylindrical wall.

The fact that only one of the bearings is in contact with the stator body makes it possible to improve the cooling of the stator by enlarging the surface of contact between these two parts. In fact, the fact of no longer having the area of junction between the two bearings facing the stator makes it possible to be no longer limited by an assembly gap which is necessary between the bearings, or by the passage of the tie rods which secure the two bearings together. An area of junction corresponds to an area of contact between the two bearings. In addition, this also makes it possible to improve the centring, and in particular the coaxiality, of the bearings relative to one another, since there is no longer an intermediate part. The constraints concerning the dimensions of the air gap are thus better controlled, and the air gap can thus be reduced.

In addition, the shrink fitting relative to a simple contact between the stator and the bearing makes it possible to improve the cooling of the stator. In fact, during its operation, the stator tends to expand under the effect of the heat, and intermittently no longer be in contact with the bearing. Better clamping provided thanks to the shrink fitting thus makes it possible to ensure better cooling.

In addition, these forms of bearing, only a single bearing of which has the form of a bowl, the other bearing having a substantially flat form, make it possible to have the stator shrink fitted only on one bearing, without increasing the axial dimensions of the machine. In addition, the fact that the second bearing has a substantially flat form makes it possible to avoid the risks of deformation of the said bearing because of the shrink fitting.

The first bearing and the second bearing form an enclosure which accommodates the rotor and the stator.

According to one embodiment, each bearing comprises a receptacle for fitting of the shaft with rotation. In other words, each bearing has an opening which permits the passage of the shaft. For example, a roller bearing is disposed between the bearing and the shaft in order to ensure the fitting of the shaft with rotation.

According to one embodiment, a ratio between an axial height of the shrink-fitted area of the first bearing and an axial height of the stator body is contained between 0.9 and 1.2, and is preferably 1. Thus, for example, the entire axial height of the stator body is shrink fitted.

According to one embodiment, a difference of diameter between an outer diameter of the stator body and an inner diameter of the cylindrical wall at the area of shrink fitting is contained between 0 and 0.7 mm.

According to one embodiment, the rim extends over an axial height which is smaller than an axial height of the cylindrical wall of the first bearing, for example over a height which is smaller than a third of the height of the said cylindrical wall. In particular, the rim extends over an axial height of approximately 3 mm.

According to one embodiment, the rim extends discontinuously along the periphery of the flange. For example, the second bearing comprises a plurality of rims forming a plurality of areas of junction with the first bearing, and the machine comprises a plurality of openings disposed between two successive areas of junction. This permits the creation of openings between the bearings, which allows the cooling of the machine to be improved.

According to one embodiment, the cylindrical wall comprises at least one cut-out which is provided, in a manner open axially, in a free end of the said wall axially opposite the flange, the said cut-out being positioned facing an opening. This makes it possible to enlarge the opening between the bearings, and thus to improve the cooling. For example, the cylindrical wall comprises a plurality of cut-outs, each being disposed facing an opening.

According to one embodiment, one of the bearings can comprise pins which extend projecting axially towards the other bearing, in order to obstruct the opening at least partly. The use of pins makes it possible to limit the entry of a foreign body into the machine, without reducing the size of the opening. Thus, the cooling of the machine is increased, whilst guaranteeing good safety of the machine in relation to the external environment. In addition, the use of pins makes it possible to limit as far as possible the quantity of material used to guarantee that foreign bodies are not inserted inside the electrical machine.

According to one embodiment, the second bearing comprises a plurality of pins.

According to one embodiment, the pin extends projecting axially from the outer periphery of the second bearing.

According to one embodiment, the pin extends over a height which is shorter than a height of the opening, with the two heights extending in the same direction. This is in particular an axial direction.

According to one embodiment, the pin has a cross-section with a round form. For example, the pin has a cross-section with a convex or curved form. "Rounded form" means a form without a sharp edge. For example, the pin has a cross-section with an oblong form. In another example, the pin has a cross-section with a rounded form.

According to one embodiment, an axis of longitudinal extension of the oblong form of the pin forms an angle contained between +10° and +70° relative to a radius of the second bearing, with the positive direction of the angle relative to the radius corresponding to the direction of rotation of the rotor of the rotary electrical machine. This angle is in particular contained between +30 and +60°.

According to one embodiment, the pin has a chamfered free end.

All these pin configurations make it possible to optimise the form of the pin in order to generate less turbulence behind the pin. This therefore limits the aeraulic noise and the losses of load in order to optimise the airflow and improve the cooling of the machine.

According to one embodiment, the pin extends spaced from the first bearing. The pin is therefore not in contact with the first bearing. This makes it possible to limit the contacts between the bearings, and thus to limit the transfer of heat by conduction between the bearings.

According to one embodiment, the cylindrical wall of the first bearing and the rim of the second bearing each comprise at least one centring portion and at least one securing portion. The centring portion of the first bearing co-operates with that of the second bearing. The securing portion of the first bearing co-operates with that of the second bearing. The centring and securing portions form at least one area of junction. The area of junction between the bearings makes possible, by means of the contact between the said bearings, a simplification of the assembly between the bearings. For example, small-sized tie rods can be used, which makes possible a saving of weight.

According to one embodiment, the machine comprises a plurality of centring portions and a plurality of securing portions. For each bearing, each centring portion is disposed facing at least one securing portion. This makes it possible to limit the surfaces of contact between the first bearing and the second bearing, in order thus to limit the thermal exchanges between the parts.

According to one embodiment, the adjustment between the centring portion of the first bearing and the centring portion of the second bearing is defined, in accordance with the ISO adjustment system, such that an inner diameter of the centring portion of the first bearing is equal to H7, and such that an outer diameter of the centring portion of the second bearing is contained between g6 and h6.

According to one embodiment, the centring portion of the second bearing is formed by a divider which extends projecting axially, and the centring portion of the first bearing is formed by a free end of the cylindrical wall, with the said centring portions being in radial contact with one another in order to ensure the centring of the second bearing with the first bearing.

According to one embodiment, each bearing comprises a securing portion which is provided with an opening for the passage of a securing unit.

According to one embodiment, each securing portion extends projecting radially from the corresponding bearing.

According to one embodiment, the machine comprises at least two securing parts which are designed to retain the said machine in the motor vehicle, with the said securing parts extending projecting from the cylindrical portion of the first bearing on both sides of the shrink-fitting area. Since the securing parts are disposed on a single bearing, the assembly tolerances of the machine on the vehicle can be reduced. This therefore makes it possible to improve the securing of the machine on the vehicle.

According to one embodiment, the machine additionally comprises an electronic module which is supported by the second bearing. In other words, the electronic module is positioned on the bearing which is not in contact with the stator body.

According to one embodiment, the machine additionally comprises a thermal insulation seal interposed between the first bearing and the second bearing in the area of junction. The fact of putting a seal between the bearings makes it possible not to transfer the heat of the stator of the bearing in contact towards the other bearing, and thus to limit the negative thermal impact of the stator on the other parts of the machine. This therefore makes it possible to improve the cooling of the rotary electrical machine. In addition, the interposition of a seal between the two bearings makes it possible to limit the straining forces between the bearings, and also to reduce the magnetic noise because of the decoupling between the two bearings, whilst guaranteeing a low production cost of the machine.

According to one embodiment, the thermal insulation seal can be interposed between the two bearings at their area of junction.

According to one embodiment, the thermal insulation seal has an annular form, for example a flat annular form.

According to one embodiment, the thermal insulation seal has a return which extends projecting from the annular portion. The return extends in particular from the outer periphery of the annular portion. For example the thermal insulation seal has a cross-section in the form of an "L".

According to one embodiment, the area of junction comprises an area of securing between the two bearings. For example, each bearing comprises a securing portion provided with an opening for the passage of a securing unit.

Again for example, the annular portion extends between the two securing portions, and has an opening for the passage of the said securing unit.

According to one embodiment, the machine additionally comprises at least one insulation grommet situated around a securing unit which extends in the securing area.

According to one embodiment, the insulation grommet comprises a cylindrical portion and an annular portion which extends from an end of the cylindrical portion.

According to one embodiment, the thermal insulation seal is made of a material selected from amongst one of the following materials: plastic, rubber, elastomer.

According to one embodiment, the thermal insulation seal has a thickness of approximately a millimetre.

According to one embodiment, the winding comprises chignons which extend on both sides of the stator body. For example a chignon comprises a solid part and a base which is situated between the solid part and the stator body. The base is formed by an alternation of conductors extending between the said solid part and the notches in the said body, and openings.

According to one embodiment, the area of junction between the first bearing and the second bearing is disposed radially facing a space in the machine which is situated axially between an axial end of one of the chignon and a transverse flange of one of the bearings. This permits improvement of the cooling of the machine by making possible a cooling opening positioning facing the chignons of the winding, and in particular facing the base of the chignons.

According to one embodiment, the rotor comprises at least one fan, which in particular is centrifugal, secured at an axial end of a body of the said rotor. For example, the rotor comprises two centrifugal fans which are secured on the axial ends of the body, respectively.

The rotary electrical machine can advantageously form an alternator, an alternator-starter or a reversible machine.

The invention will be better understood by reading the following description and examining the figures which accompany it. These figures are provided purely by way of illustration, and in no way limit the invention.

Elements which are identical, similar or analogous retain the same reference from one figure to another. In addition, a front element is situated on the free end side of the shaft which is designed to support the pulley, whereas a rear element is situated on the opposite side, i.e. on the electronic control module side.

Figure 1:
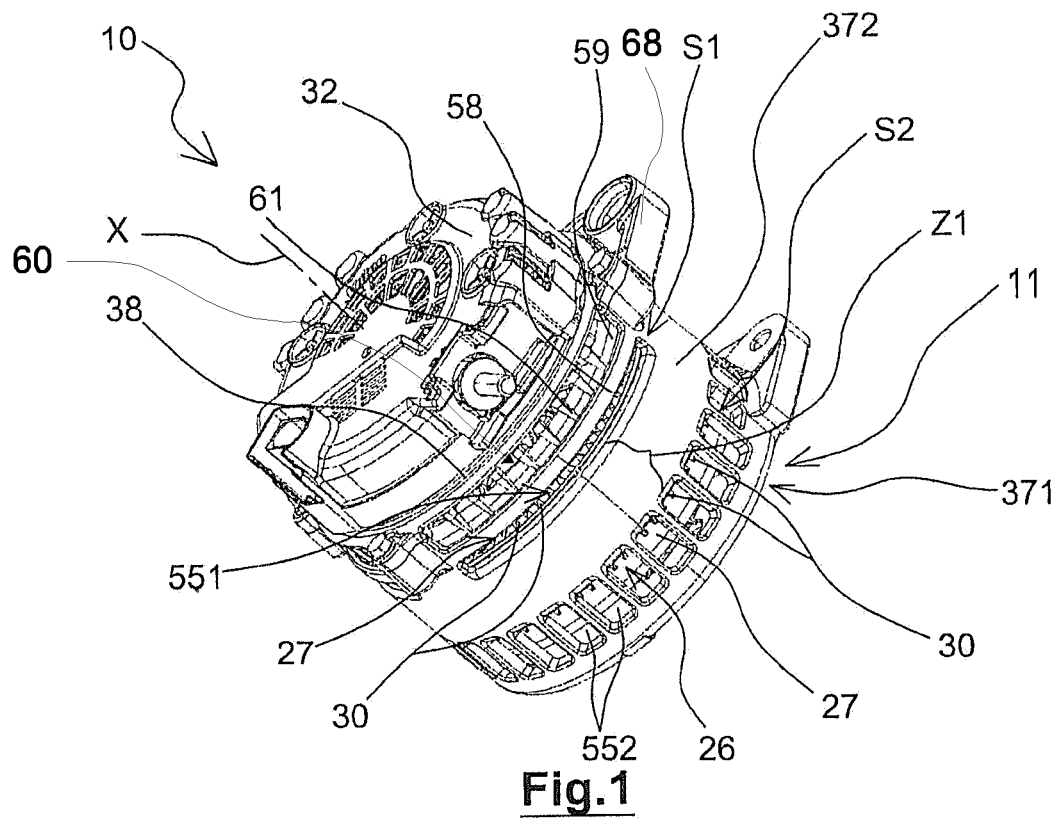
FIG. 1 is a view in perspective of a rotary electrical machine according to an embodiment of the present invention.
Figure 2:
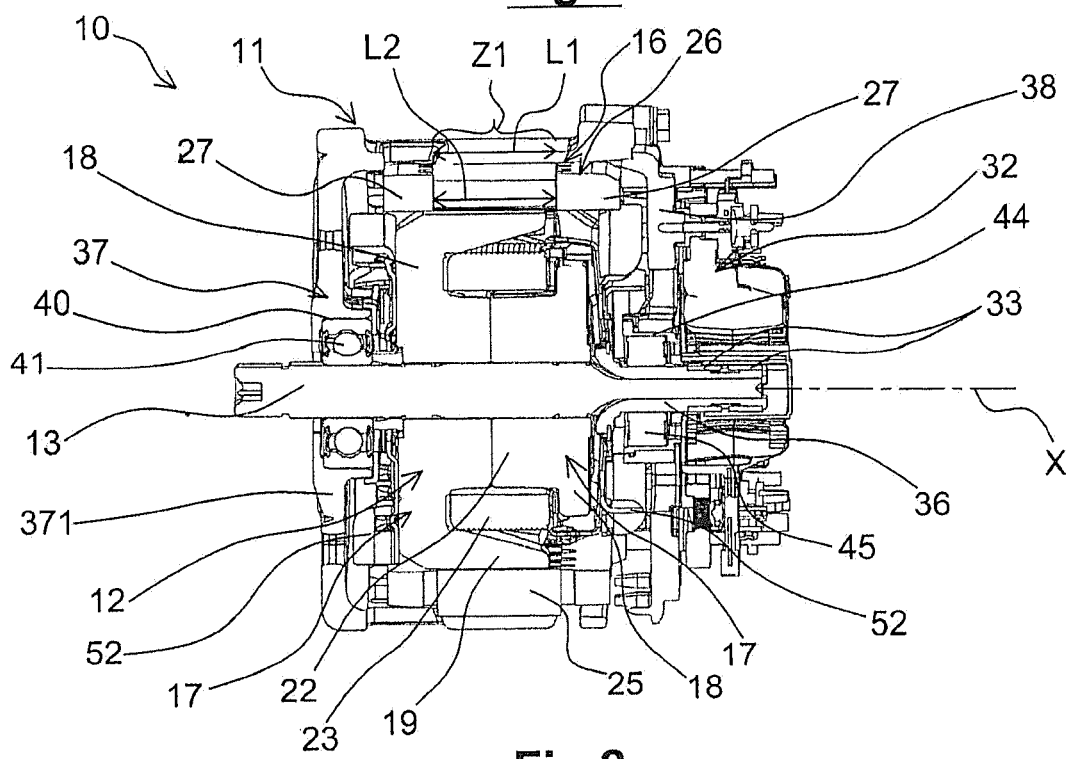
FIG. 2 is a view in longitudinal cross-section of the rotary electrical machine according to the example in FIG. 1.

FIGS. 1 and 2 represent a compact polyphase rotary electrical machine 10, in particular for a motor vehicle. This machine 10 transforms mechanical energy into electrical energy, and can be reversible. A reversible machine 10 of this type makes it possible to transform electrical energy into mechanical energy, in particular in order to start the thermal engine of the vehicle.

This machine 10 comprises a housing 11 in its interior, a rotor with claws 12 fitted on a shaft 13 extending along an axis X corresponding to the axis of rotation of the electrical machine, and a stator 16 which surrounds the rotor 12 with the presence of an air gap between the outer periphery of the rotor 12 and the inner periphery of the stator 16. A pulley is designed to be secured on the free end of the shaft 13. This pulley belongs to a movement transmission device with a belt between the machine 10 and the thermal engine of the motor vehicle.

Hereinafter in the description, the terms axial, radial, external and internal refer to the axis X which passes through the shaft 13 in its centre. The axial direction corresponds to the axis X, whereas the radial orientations correspond to planes which are concurrent with, and in particular perpendicular to, the axis X. For the radial directions, the terms outer or inner are understood relative to a single axis X, with the term inner corresponding to an element oriented towards the axis, or closer to the axis than a second element, and the term outer designating spacing from the axis.

For example, as can be seen in FIG. 2, the rotor 12 comprises two magnet wheels 17 which each have a plate 18 with transverse orientation provided on its outer periphery with claws 19, for example with a trapezoidal form and axial orientation. The claws 19 of one wheel 17 face axially towards the plate 18 of the other wheel 17. Each claw 19 of a magnet wheel 17 penetrates into the space which exists between two adjacent claws 19 of the other magnet wheel 17, such that the claws 19 of the magnet wheels 17 are imbricated relative to one another. A cylindrical core 22 is interposed axially between the plates 18 of the wheels 17. In this case, the core 22 consists of two half-cores, each belonging to one of the plates 18. This core 22 supports an excitation coil 23 on its outer periphery.

The stator 16 comprises a body 25 as well as an electrical winding 26. For example, the body 25 is constituted by a stack of thin metal plates forming a crown, the inner face of which is provided with teeth delimiting in pairs notches which are open towards the interior of the stator body 25.

The winding 26 can be made from a plurality of conductors inserted in the notches in the stator body 25, and forming chignons 27 which project from both sides of the body 25. The chignons 27 each comprise a solid part and a base extending between the solid part and the stator body 25. Each base comprises openings 30 extending between conductors of the winding 26 coming out of, or going into, notches in the body, as shown in FIG. 1. The conductors can be constituted for example by continuous wires covered with enamel, or by conductive elements in the form of pins which are connected to one another by welding.

The phase outputs of the winding 26, connected in the form of a star or triangle, are connected to an electronic control module 32 comprising rectifier elements, such as diodes or transistors of the MOSFET type, in particular when an alternator starter is involved as described for example in document FR2745445. The machine 10 also comprises a brush-holder provided with brushes which are designed to rub against rings 33 of a collector 36, which rings are connected by wired connections to the excitation winding 23 of the rotor 12.

In addition, the housing 11 comprises a front bearing 37 and a rear bearing 38 assembled to one another. These bearings 37, 38 can for example be made from a material based on aluminium.

Figure 3:
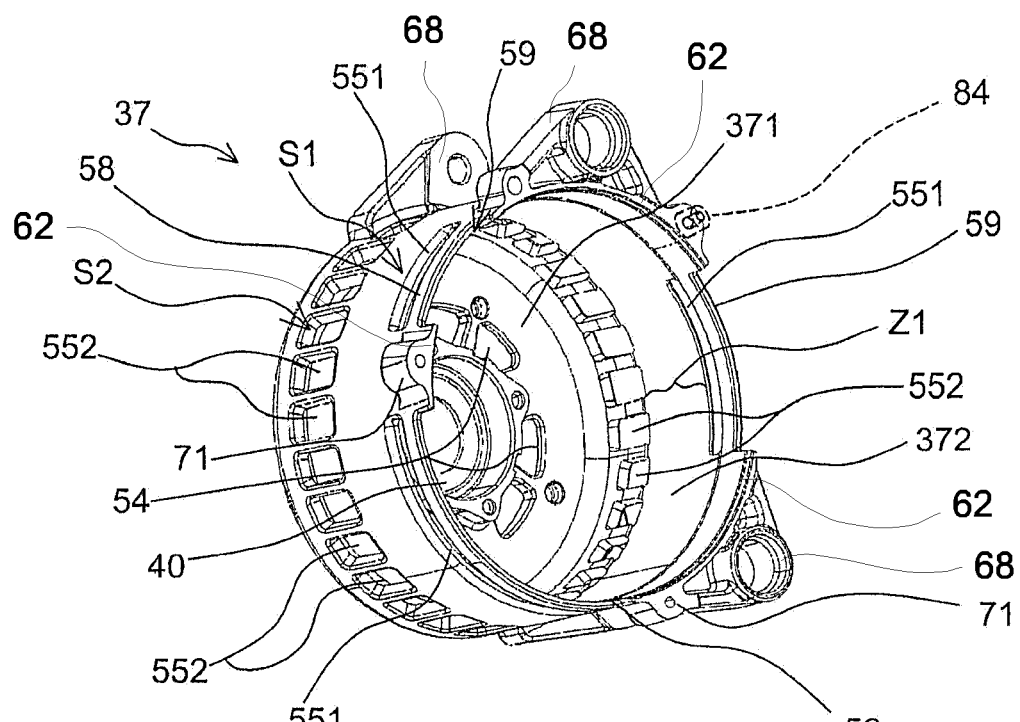
FIG. 3 is a view in perspective of the front bearing of the rotary electrical machine according to the example in FIG. 1.

As can be seen in FIG. 3, the front bearing 37, which is globally in the form of a bowl, comprises a flange 371 extending transversely relative to the axis X, i.e. in a direction which is substantially perpendicular relative to the axis X. This flange 371 is provided centrally with a receptacle 40 which receives a bearing 41 for fitting of the rotor shaft 13 with rotation. The front bearing 37 also comprises a cylindrical wall 372 extending axially from the outer periphery of the flange 371 and forming a cylindrical skirt. The cylindrical wall 372 is in a single piece with the flange 371, i.e. it is integral with it.

The front bearing 37 is closed axially by the rear bearing 38, comprising a transverse flange 48 which comprises a receptacle 44 receiving a roller bearing 45 for fitting with rotation of the rear end of the rotor shaft 13. The rear bearing 38 supports the electronic control module 32, in particular on its rear face. For this purpose, the flange 48 can comprise small securing columns, not represented, extending projecting from the flange 48 for the passage of screws for securing of the module 32. In addition, axial openings 49 can be provided in the flange 48 in order to permit the passage of the phase outputs of the winding 26 which are designed to be connected electrically to the control module 32.

Figure 4:
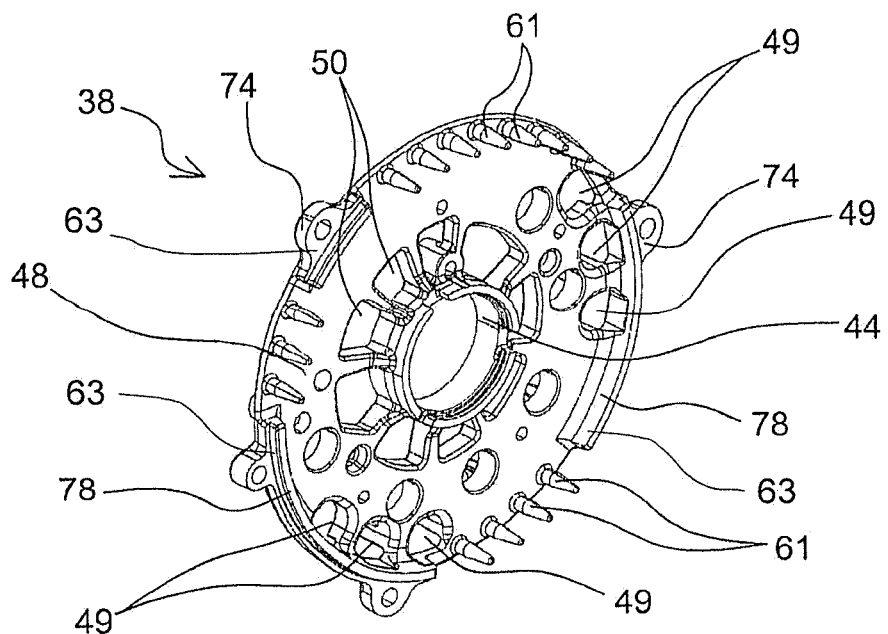
FIG. 4 is a view in perspective of the rear bearing of the rotary electrical machine according to the example in FIG. 1.

As illustrated in FIG. 4, the flange 48 of the rear bearing 38 can be extended by a rim 63 extending axially over a height which is significantly less than the height of the cylindrical wall 372. In particular, the rim 63 extends over an axial height which is less than a third of the axial height of the cylindrical wall of the first bearing. In particular, the rear bearing 38 comprises a plurality of rims 63, each extending projecting from a portion of the periphery of the flange 48. The rims 63 are thus distinct from one another, and distributed angularly around the circumference of the flange 48. The distribution can be carried out irregularly, i.e. the rims 63 can be positioned at different distances from one another around the circumference of the flange 48. According to a variant, the distribution can be carried out regularly, i.e. the rims 63 can be positioned at an equal distance from one another around the circumference of the flange 48. In addition, the rims 63 can have different circumferential lengths.

The rims 63 are separated from one another circumferentially by openings 60, shown in FIG. 1, formed between the front bearing 37 and the rear bearing 38, and in particular between the cylindrical wall 372 and the flange 48. The cylindrical wall 372 can have a cut-out 59 provided at the opening 60, making it possible to enlarge the said opening 60. Thus, the free end of the cylindrical wall comprises an alternation of areas of contact with the rims 63 and cut-outs 59. More specifically, each cut-out 59 is open axially in the direction of the rear bearing 38. For example, the rear bearing 38 comprises a plurality of pins 61 extending projecting axially from a front face of the flange 48, which face faces towards the front bearing 37.

The pins 61 are in particular situated on the outer periphery of the rear bearing 38. In this example, the pins 61 extending projecting from the flange 64, and are disposed between two rims 63. These pins 61 close at least partly the opening 60 situated between the two bearings. More specifically, these pins close at least partly the cut-out 59 provided in the front bearing 37. According to a variant embodiment not represented, the pins 61 can extend from the front bearing to the rear bearing.

For example, the pins 61 can extend around the same circumference, and can be spaced regularly around this circumference. According to a variant embodiment, the pins 61 can extend around different circumferences, and/or can be spaced irregularly. For example, the pins 61 can extend in a staggered manner.

The pins 61 extend in the opening 60, and are not in contact with the bearing towards which they extend. Thus, if the pin extends from the rear bearing, it is disposed spaced from the front bearing. Thus, the pin extends over an axial height which is shorter than the axial height of the opening 60.

According to one embodiment, the pins 61 have a cross-section with a rounded form which is advantageously oblong or circular. As a variant, the pins 61 can have a cross-section which is rectangular, or trapezoidal or conical.

Figure 7:
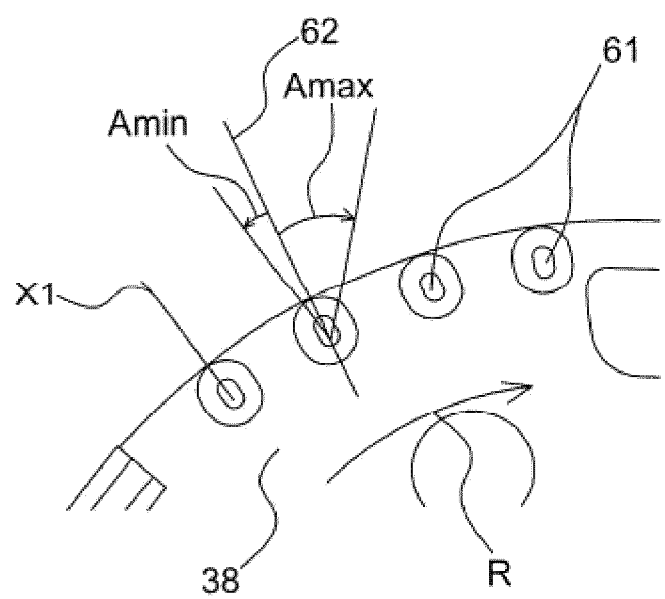
FIG. 7 is a view from above illustrating an orientation of the pins of the rotary electrical machine according to the example in FIG. 1.

As illustrated in FIG. 7, an axis X1 of longitudinal extension of the oblong form of the pins 61 forms an angle A relative to a radius 62 of the rear bearing 38, contained between a minimum angle Amin of −15°, and a maximum angle Amax of +70°. The positive direction of the angle corresponds to the direction of rotation R of the rotor 12 of the electrical machine 10. The angle A is preferably contained between +10 and +70°, and in particular contained between +30 and +60°.

For example, the pins each have a chamfered free end, and thus only the free end of the pin has a substantially conical form, and the part of the pin which extends between the free end and the flange 64 has a substantially cylindrical form.

In all cases, the pins 61 extend spaced from the front bearing 37, in order to avoid the conduction of heat from the front bearing 37 to the rear bearing 38. Thus, the pins 61 have an axial height L3 which is shorter than an axial height of the opening 60.

According to a variant embodiment not represented, the front bearing 37 and the rear bearing 38 each comprise pins 61', 61. The pins 61' of the front bearing are obtained from a rim of the cut-out 59. According to this staggered configuration, the pins 61 of the rear bearing 38 penetrate into the spaces between two adjacent pins 61' of the front bearing 37, and the pins 61' of the front bearing 37 penetrate into the spaces between two adjacent pins 61 of the rear bearing 38.

As illustrated in FIGS. 1 and 2, the cylindrical wall 372 of the front bearing 37 comprises an area Z1 of shrink fitting with the stator body 25. For this purpose, the front bearing 37 is heated to a high temperature until the material expands, then cooled, such that the outer periphery of the stator body 25 is retained secured against the inner periphery of the front bearing 37. Since the outer periphery of the stator body 25 is in close contact with the inner periphery of the front bearing 37, as a result of the shrink-fitting operation, this makes it possible to facilitate the discharge by conduction of the heat generated by the stator 16 via the shrink-fitted bearing.

Figure 5:
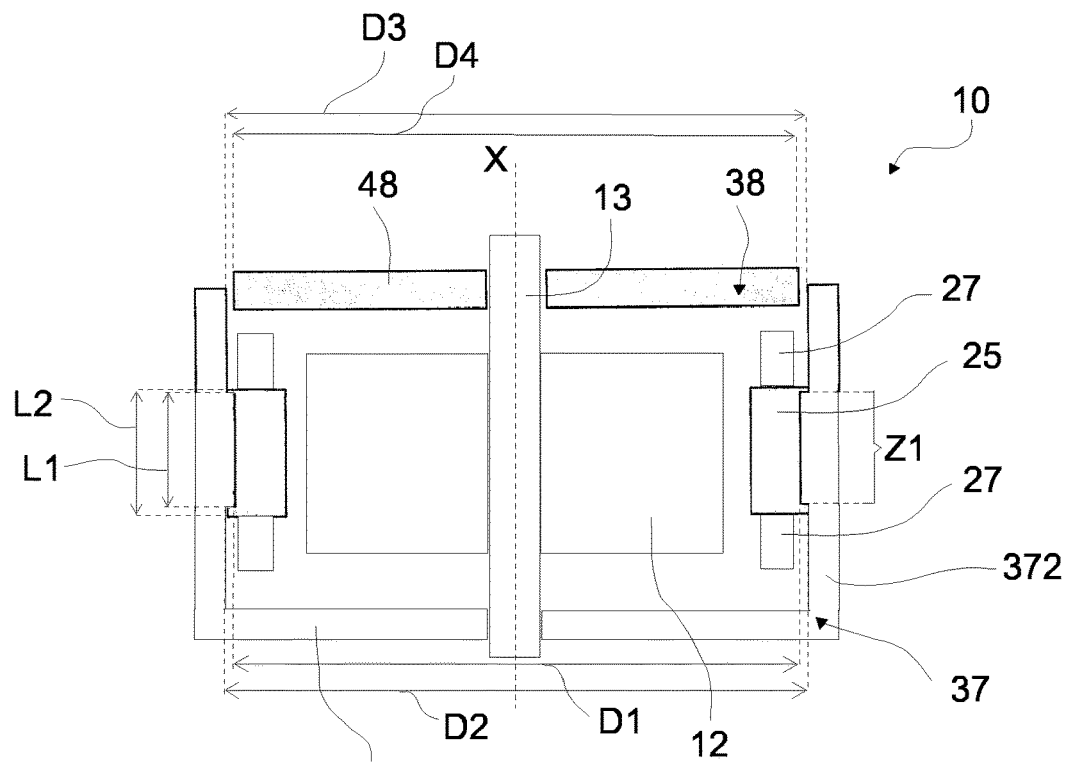
FIG. 5 is a schematic view of the rotary electrical machine according to the example in FIG. 1.

As can be seen in FIGS. 2 and 5, a ratio between a height L1 of the shrink-fitting area Z1 of the front bearing 37 and a height L2 of the stator body 25 is contained between 0.9 and 1.2, and is preferably 1. The heights L1 and L2 are measured in a direction which is axial relative to the axis X. As this ratio shows, the shrink-fitting area Z1 can extend slightly beyond the stator body 25 on both sides of the said stator body 25.

In addition, as illustrated by FIG. 5, the difference between an outer diameter D2 of the stator body 25 and an inner diameter D1 of the cylindrical wall 372 at the shrink-fitting area Z1 is contained between 0 and 0.7 mm Thus, in a certain configuration, the cylindrical wall 372 can be pushed into the stator body 25 at the shrink-fitting area Z1. This adjustment makes possible clamped fitting of the stator 16 in the front bearing 37, and there is then no need for additional means for retention of the stator. This also permits improved cooling by conduction of the stator.

The rims 63 form areas of junction 64 with the front bearing 37, since each rim 63 is in contact with the cylindrical wall 372. The areas of junction 64 comprise only portions of securing of the first bearing with the second bearing and/or portions of centring between the said bearings. Thus, each area of contact of the cylindrical wall 372 comprises at least one securing portion 71 and/or at least one centring portion 62. Similarly, each rim 63 comprises at least one securing portion 74 and/or at least one centring portion 78. The said securing portions 71, 74 co-operate respectively with one another in order to secure the two bearings together. The said centring portions 62, 78 co-operate respectively with one another in order to centre the two bearings together.

In this embodiment, each area of junction 64 comprises both a centring portion 62, 78 of each bearing and a securing portion 71, 74 of each bearing. Thus, a centring portion of one of the bearings is disposed facing a securing portion of the said bearing. In the example in FIG. 4, the rear bearing 38 comprises three rims 63, the first two rims each comprise a securing portion and a centring portion, and the final rim comprises a centring portion and two securing portions.

For example, each securing portion 71, 74 extends projecting radially from a part of the bearing associated in an exterior direction, i.e. opposite the axis X. In this case, each securing portion 71 is obtained from the cylindrical wall 372 of the front bearing 37, and each securing portion 74 is obtained from the flange 48 of the rear bearing 38, and participates in the formation of a rim 63. The securing portions 71 are situated on the outer periphery of the cylindrical wall 372 at its free end opposite the flange 371. In addition, each securing portion 71 is provided with an opening 72 positioned such as to coincide with an opening 73 provided in a securing portion 74 for the passage of a securing unit 75, such as a screw or a tie rod.

As represented schematically in FIG. 5, an adjustment between the centring portion 62 of the first bearing 37 and the centring portion 78 of the second bearing 38 is defined, in accordance with the ISO industrial designer adjustment system, such that an inner diameter D3 of the centring portion 62 is equal to H7, and that an outer diameter D4 of the centring portion 78 is contained between g6 and h6. The characteristic g6 combined with the characteristic H7 corresponds to sliding centring, i.e. a slight gap can exist between the two centring portions 62, 78 of the two bearings. The characteristic h6 combined with the characteristic H7 corresponds to adjusted or clamped centring, i.e. there is no gap between the two centring portions 62, 78 of the two bearings.

These characteristics H7, g6 and h6 result in acceptable tolerance limit values during the production of the bearings. For a reference temperature of 20° C., when the inner diameter D3 is contained between 120 mm and 180 mm, H7 corresponds to tolerance values contained between 0 and +40 µm, g6 corresponds to tolerance values contained between −14 µm and −39 µm, and h6 corresponds to tolerance values contained between 0 and −25 µm. Thus for example, when the inner diameter D3 is contained between 139 mm and 139.4 mm, the outer diameter D4 is contained between 139 mm and 138.61 mm. In general, the outer diameter D4 is contained between 120 mm and 180 mm.

For example, the centring portion 78 of the rear bearing is formed by a divider 78 obtained from the flange 48. The divider is supported against an inner periphery of the cylindrical wall 372 which forms the centring portion 62 of the front bearing 37. At its base, the divider is delimited axially by an end face of a portion of the securing portion 74 of the rear bearing forming an axial stop. The centring height corresponding to the height of the divider is short. It is preferably less than 3 mm. As a variant, the structure can be inverted, i.e. the divider can belong to the front bearing 37, and can be supported against an inner periphery of the flange 48.

Figure 6:
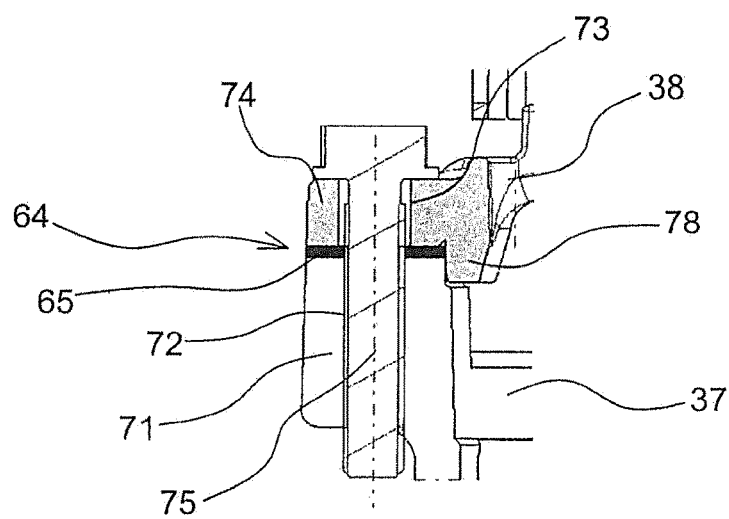
FIG. 6 is a partial view in cross-section illustrating an example of a configuration of a thermal insulation seal which can be implanted in an area of junction between the bearings of the rotary electrical machine.

As illustrated in FIG. 6, the contact surfaces between the two bearings 37, 38 can be limited by providing the openings 60, and by insulating the two bearings 37, 38 thermally against one another at the areas of junction 64. For example, a thermal insulation seal 65 can be interposed between the front bearing 37 and the rear bearing 38 in least one area of junction 64.

In the example represented here, the seal 65 has a flat annular form extending on a radial plane, i.e. a form of a washer. The thermal insulation seal 65 is positioned axially between the two end faces of the securing portions 71, 74. The annular form delimits an opening disposed facing respective openings in the securing portions 71, 74, in order to permit the passage of the securing unit 75. The machine 10 can comprise a plurality of seals 65 each disposed between two facing securing portions. Each seal is then independent from the other seals. According to a variant embodiment, the seals 65 can be connected to one another via connection portions (not represented).

According to another embodiment, not represented, the thermal insulation seal can be disposed between the securing portions 71, 74 and the associated centring portions 62, 78 of the two bearings 37, 38. For example, the thermal insulation seal 65 comprises an annular portion extending on a radial plane, and a return with axial orientation extending from the outer periphery of the annular portion. The annular portion is then disposed between two securing portions, and the return is disposed between two centring portions. In addition, a thermal insulation grommet, not represented, can be situated around the securing unit 75 penetrating in the securing portions 71, 74. This therefore prevents the transmission of heat, by means of the said unit 75, from the front bearing 37 to the rear bearing 38.

The thermal insulation seals 65 and the insulation grommet can for example be made of a material selected from one of the following materials: plastic, rubber, or elastomer. For example, the seal 65 and/or the insulation grommet have a thickness of approximately a millimetre.

As a variant, as illustrated in FIG. 3 by a broken line, the centring portions can consist of hollow protuberances 84 obtained from the front bearing 37, which are designed to be inserted in the corresponding openings 73 in the securing portion of the rear bearing 38. These hollow protuberances 84 extend around securing openings 72 for the passage of the securing units 75. As a variant, the hollow protuberances 84 belong to the rear bearing 38, and are engaged in the openings 72 in the front bearing 37. It is then possible to eliminate the dividers 78, with the protuberances forming centring means.

In the example in FIG. 2, fans 52 are implanted on the axial ends of the rotor 12 in order to generate a current of air in the interior of the machine, passing via the ventilation holes provided in the front bearing 37 and in the rear bearing 38. For example, axial ventilation holes 50, 54 are provided in the flanges of the bearings, and radial ventilation holes 551, 552 are provided in the cylindrical wall 372 of the front bearing 37. For example, the fans are centrifugal fans, the axial ventilation holes are air intake openings, and the radial ventilation holes are air output openings.

In this case, the rear bearing 37 comprises axial ventilation holes 54 provided in the flange 371, for example around the roller bearing receptacle 40. The front bearing 37 also comprises a first series S1 of ventilation holes 551, and a second series S2 of lateral ventilation holes 552 provided in the cylindrical wall 372 on both sides of the stator body 25. The ventilation holes 551 of the first series S1 have a form which is elongate circumferentially. The ventilation holes 552 of the second series S2 have a form which is elongate axially relative to the axis X. The ventilation holes 552 of the second series S2 are in this case more numerous than the ventilation holes 551 of the first series S1. The shrink-fitting area Z1 extends axially between the ventilation holes 551 of the first series S1 and the ventilation holes 552 of the second series S2. The ventilation holes 552 of the second series S2 are spaced angularly regularly relative to one another, and are separated in pairs by separation arms. As a variant, the said ventilation holes 552 can be spaced angularly irregularly relative to one another in order to improve the acoustics of the said machine 10. Each ventilation hole 551, 552 of these series S1, S2 is situated radially at least partly facing at least one opening 30 in the base of a chignon 27.

Also, in the embodiment illustrated here, a ventilation opening 551 of the first series S1 extends axially between the shrink-fitting area Z1 of the front bearing 37 and a corresponding lateral bar 58. This lateral bar 58 separates the ventilation opening 551 from the associated cut-out 59 provided on the free end side of the front bearing 37 opposite the flange 371. In order not to impede the passage of the air, the lateral bar 58 is preferably superimposed radially with a solid part of a chignon 27. The lateral bar has an axial height which is shorter than the axial height of the solid part of the corresponding chignon 27.

As can be seen in FIG. 3, the machine 10 comprises at least two securing parts 68, which are designed to retain the said machine in the motor vehicle. The securing parts 68 extend projecting radially from the cylindrical portion 372 of the first bearing 37 on both sides of the shrink-fitting area Z1. The two securing parts 68 are for example aligned axially. In this case, case, the machine comprises four securing parts 68 disposed in pairs, as previously described, and spaced angularly on the periphery of the cylindrical wall 372. Each securing part 68 comprises an opening for the passage of a securing screw. As a variant, any other securing means can be used, such as clipping on.

It will be appreciated that the foregoing description has been provided purely by way of example, and does not limit the field of the invention, a departure from which would not be constituted by replacing the different elements by any other equivalents. In addition, the different characteristics, variants and/or embodiments of the present invention can be associated with one another according to various combinations, provided that they are not incompatible or mutually exclusive.

The invention claimed is:

1. A rotary electrical machine for a motor vehicle, the machine comprising:
a shaft which extends along an axis;
a rotor fitted on the shaft;
a stator which surrounds the rotor with the presence of an air gap, the said stator comprising a body provided with notches and a winding inserted in the notches; and
a first bearing and a second bearing surrounding an assembly formed by the rotor and the stator,
wherein:
the first bearing comprises a transverse flange and a cylindrical wall with axial orientation obtained from an outer periphery of the said flange,
the second bearing, having a substantially flat form, comprises a transverse flange which closes the first bearing and at least one rim which extends projecting from the flange and forms an area of junction with the first bearing, and
the stator body comprises an area of shrink fitting with the cylindrical wall.

2. The rotary electrical machine according to claim 1, wherein a ratio between an axial height of the shrink-fitted area of the first bearing and an axial height of the stator body is contained between 0.9 and 1.2.

3. The rotary electrical machine according to claim 1, wherein a difference of diameter between an outer diameter of the stator body and an inner diameter of the cylindrical wall at the area of shrink fitting is contained between 0 and 0.7 mm.

4. The rotary electrical machine according to claim 1, wherein the second bearing comprises a plurality of rims forming a plurality of areas of junction with the first bearing, and in that the machine comprises a plurality of openings disposed between two successive areas of junction.

5. The rotary electrical machine according to claim 4, wherein one of the bearings comprises pins which extend projecting axially towards the other bearing, to obstruct the opening at least partly.

6. The rotary electrical machine according to claim 4, wherein the cylindrical wall comprises at least one cut-out which is provided, in a manner open axially, in a free end of the said wall axially opposite the flange, the said cut-out being positioned facing an opening.

7. The rotary electrical machine according to claim 1, wherein the cylindrical wall of the first bearing and the rim of the second bearing each comprise at least one centring portion and at least one securing portion, wherein the centring portion of the first bearing co-operates with that of the second bearing and the securing portion of the first bearing co-operates with that of the second bearing, with the said centring and securing portions forming at least one area of junction.

8. The rotary electrical machine according to claim 7, further comprising a plurality of centring portions and a plurality of securing portions, wherein for each bearing, each centring portion is disposed facing at least one securing portion.

9. The rotary electrical machine according to claim 7, wherein the adjustment between the centring portion of the first bearing and the centring portion of the second bearing is defined, in accordance with the ISO adjustment system, such that an inner diameter of the centring portion of the first bearing is equal to H7, and such that an outer diameter of the centring portion of the second bearing is contained between g6 and h6.

10. The rotary electrical machine according to claim 7, wherein the centring portion of the second bearing is formed by a divider which extends projecting axially, and the centring portion of the first bearing is formed by a free end of the cylindrical wall, with the said centring portions being in radial contact with one another in order to ensure the centring of the second bearing with the first bearing.

11. The rotary electrical machine according to claim 1, the machine further comprising at least two securing parts which are configured to retain the machine in the motor vehicle, with the securing parts extending projecting from the cylindrical portion of the first bearing on both sides of the shrink-fitting area.

12. The rotary electrical machine according to claim 1, the machine further comprising an electronic module which is supported by the second bearing.

13. The rotary electrical machine according to claim 1, further comprising a thermal insulation seal interposed between the first bearing and the second bearing in the area of junction.

\* \* \* \* \*